US012612138B2

(12) United States Patent
Kuchiki et al.

(10) Patent No.: US 12,612,138 B2
(45) Date of Patent: Apr. 28, 2026

(54) EVACUATION GUIDANCE SYSTEM AND EVACUATION GUIDANCE METHOD

(71) Applicant: MITSUBISHI SHIPBUILDING CO., LTD., Kanagawa (JP)

(72) Inventors: Yusuke Kuchiki, Yokohama (JP); Shingen Takeda, Yokohama (JP); Toshiyuki Komiya, Yokohama (JP)

(73) Assignee: MITSUBISHI SHIPBUILDING CO., LTD., Yokohama (JP)

( * ) Notice: Subject to any disclaimer, the term of this patent is extended or adjusted under 35 U.S.C. 154(b) by 132 days.

(21) Appl. No.: 18/685,301

(22) PCT Filed: Apr. 21, 2022

(86) PCT No.: PCT/JP2022/018445
§ 371 (c)(1),
(2) Date: Feb. 21, 2024

(87) PCT Pub. No.: WO2023/026587
PCT Pub. Date: Mar. 2, 2023

(65) Prior Publication Data
US 2025/0121915 A1 Apr. 17, 2025

(30) Foreign Application Priority Data

Aug. 26, 2021 (JP) ................................. 2021-137693

(51) Int. Cl.
*B63B 43/00* (2006.01)
*G01C 21/20* (2006.01)
(52) U.S. Cl.
CPC .............. *B63B 43/00* (2013.01); *G01C 21/20* (2013.01); *B63B 2043/003* (2013.01)

(58) Field of Classification Search
CPC ... B63B 43/00; B63B 2043/003; B63B 79/10; B63B 2203/00; G01C 21/20; H04W 4/38;
(Continued)

(56) References Cited

U.S. PATENT DOCUMENTS 9,513,134 B1 12/2016 Ishikawa et al.
2005/0273226 A1 12/2005 Tani
(Continued)

FOREIGN PATENT DOCUMENTS

JP H07-222812 A 8/1995
JP 2003-109149 A 4/2003
(Continued)

OTHER PUBLICATIONS

Machine Translation of KR102095630 (Year: 2020).*
(Continued)

*Primary Examiner* — Anne Marie Antonucci
*Assistant Examiner* — Jordan T Smith
(74) *Attorney, Agent, or Firm* — HAUPTMAN HAM, LLP

(57) ABSTRACT

An evacuation guidance system includes: an evacuation guidance management system that acquires information of a disaster which has occurred in a marine vessel, acquires passenger position information in the marine vessel, formulates an evacuation route, and specifies a passenger to be subjected to evacuation guidance and a position of the passenger; and a mobile body that performs control to move an own device to the position of the specified passenger on the basis of the specified passenger and the position of the passenger and to move the own device along the evacuation route while outputting guidance information to the passenger.

9 Claims, 4 Drawing Sheets

(58) Field of Classification Search

CPC ....... H04W 4/024; H04W 4/42; H04W 4/029; H04W 4/90; H04W 4/02; H04W 4/80; B25J 11/008; B25J 5/00; B25J 11/00; G06Q 50/40; G06Q 90/205; G06Q 90/20; G06Q 50/10; G08B 7/066; G08B 17/00; G08B 21/182; G08B 25/10; G08G 3/00

See application file for complete search history.

(56) References Cited

U.S. PATENT DOCUMENTS

| | | | |
|---|---|---|---|
| 2017/0358201 A1 * | 12/2017 | Govers | ............... G05D 1/0248 |
| 2018/0089785 A1 | 3/2018 | Imoto et al. | |
| 2018/0195868 A1 * | 7/2018 | Rezvani | .............. G01C 21/343 |
| 2019/0351558 A1 * | 11/2019 | Park | ........................... G06T 7/70 |
| 2020/0130197 A1 * | 4/2020 | Roh | ........................ B25J 9/161 |
| 2020/0341480 A1 * | 10/2020 | Jung | ................... G05D 1/0223 |
| 2020/0348697 A1 | 11/2020 | Kuhara et al. | |
| 2022/0055207 A1 * | 2/2022 | Higashi | ................. B25J 13/089 |
| 2022/0349716 A1 * | 11/2022 | Rachedi | ................ G08B 7/066 |
| 2023/0078676 A1 * | 3/2023 | Exner | ................... B64C 39/024 |
| | | | 340/577 |

FOREIGN PATENT DOCUMENTS

| | | | | |
|---|---|---|---|---|
| JP | 2005304516 A | | 11/2005 | |
| JP | 2007286740 A | * | 11/2007 | |
| JP | 2008142876 A | | 6/2008 | |
| JP | 2018-181285 A | | 11/2018 | |
| JP | 2020-194219 A | | 12/2020 | |
| JP | 2021-047482 A | | 3/2021 | |
| KR | 102095630 B1 | * | 3/2020 | ............ B25J 19/023 |
| KR | 10-2020-0116560 A | | 10/2020 | |
| WO | 2016157279 A1 | | 10/2016 | |
| WO | WO-2018051349 A1 | * | 3/2018 | ....... G08B 13/19647 |
| WO | 2020110400 A1 | | 6/2020 | |

OTHER PUBLICATIONS

Machine Translation of JP2007286740 (Year: 2007).*

International Search Report and Written Opinion of PCT Application No. PCT/JP2022/018445 dated Jul. 5, 2022, 11 pp.

* cited by examiner

START

S31
ACQUIRE CONTROL INFORMATION

S32
SEARCH FOR TARGET PERSON

S33
HAS GUIDANCE ROBOT REACHED POSITION OF TARGET PERSON?
NO
YES

S34
SWITCH OPERATION MODE FROM SEARCH MODE TO EVACUATION GUIDANCE MODE

S35
GUIDE TARGET PERSON

S36
HAS GUIDANCE BEEN COMPLETED ?
NO
YES

END

900

901
CPU

902
MAIN STORAGE DEVICE

903
AUXILIARY STORAGE DEVICE

904
INPUT/OUTPUT I/F

905
COMMUNICATION I/F

EVACUATION GUIDANCE SYSTEM AND EVACUATION GUIDANCE METHOD

RELATED APPLICATIONS

The present application is a National Phase of International Application Number PCT/JP2022/018445 filed Apr. 21, 2022 and claims priority to Japanese Application Number 2021-137693 filed Aug. 26, 2021.

TECHNICAL FIELD

The present disclosure relates to an evacuation guidance system and an evacuation guidance method.

Priority is claimed on Japanese Patent Application No. 2021-137693, filed Aug. 26, 2021, the content of which is incorporated herein by reference.

BACKGROUND ART

When a fire or flooding occurs in a marine vessel, passengers are encouraged to evacuate by onboard broadcasting, and crew members guide the passengers to evacuate. Patent Document 1 discloses a system that supports evacuation guidance by onboard broadcasting and the like and reliably evacuates passengers. For example, in the system disclosed in Patent Document 1, a management device transmits information (for example, the number or position of nearby passengers, an evacuation direction, an evacuation site, and the like) necessary for guiding the passengers to evacuate to a mobile terminal possessed by a crew member, and the crew member guides the passengers to the evacuation site on the basis of this information.

CITATION LIST

Patent Document

[Patent Document 1]
  Japanese Unexamined Patent Application, First Publication No. 2003-109149

SUMMARY OF INVENTION

Technical Problem

The evacuation guidance support system disclosed in Patent Document 1 can be used to perform the evacuation guidance for the passengers. However, when the evacuation guidance by the crew members is limited depending on a disaster situation or there is a shortage of crew members, there is a possibility that some passengers will be late to escape.

The present disclosure provides an evacuation guidance system and an evacuation guidance method that can solve the above problems.

Solution to Problem

According to an aspect of the present disclosure, there is provided an evacuation guidance system including: a management system including a disaster information acquisition unit configured to acquire information of a disaster which has occurred in a marine vessel, a personnel distribution information acquisition unit configured to acquire position information of passengers in the marine vessel on the basis of information of a sensor which detects a person, a route calculation unit configured to formulate an evacuation route on the basis of passage passability information which is set from the position information of the passengers from the personnel distribution information acquisition unit and the information of the disaster, and a guidance target passenger specification unit configured to specify a passenger to be subjected to evacuation guidance and a position of the passenger from the position information of the passengers acquired by the personnel distribution information acquisition unit and the information of the disaster; and a mobile body including a control unit configured to move an own device to the position of the passenger specified by the guidance target passenger specification unit on the basis of the specified passenger and the position of the specified passenger and to move the host device along the evacuation route calculated by the route calculation unit to guide the passenger when the host device is moved to the position of the passenger.

According to another aspect of the present disclosure, there is provided an evacuation guidance method executed by an evacuation guidance system that performs evacuation guidance for passengers using a mobile body. The evacuation guidance method includes: a step of acquiring information of a disaster which has occurred in a marine vessel; a step of acquiring position information of the passengers in the marine vessel on the basis of information of a sensor which detects a person; a step of formulating an evacuation route on the basis of passage passability information which is set from the position information of the passengers and the information of the disaster; a step of specifying the passenger to be subjected to the evacuation guidance and a position of the passenger from the position information of the passengers and the information of the disaster; a step of moving the mobile body to the position of the specified passenger on the basis of the specified passenger and the position of the specified passenger; and a step of, when an own device is moved to the position of the specified passenger, moving the mobile body along the evacuation route to guide the passenger.

Advantageous Effects of Invention

According to the evacuation guidance system and the evacuation guidance method, it is possible to reduce the number of crew members required for evacuation guidance.

DESCRIPTION OF EMBODIMENTS

Embodiment

Hereinafter, an evacuation guidance system according to an embodiment of the present disclosure will be described with reference to FIGS. 1 to 5.

(Configuration)

Figure 1:
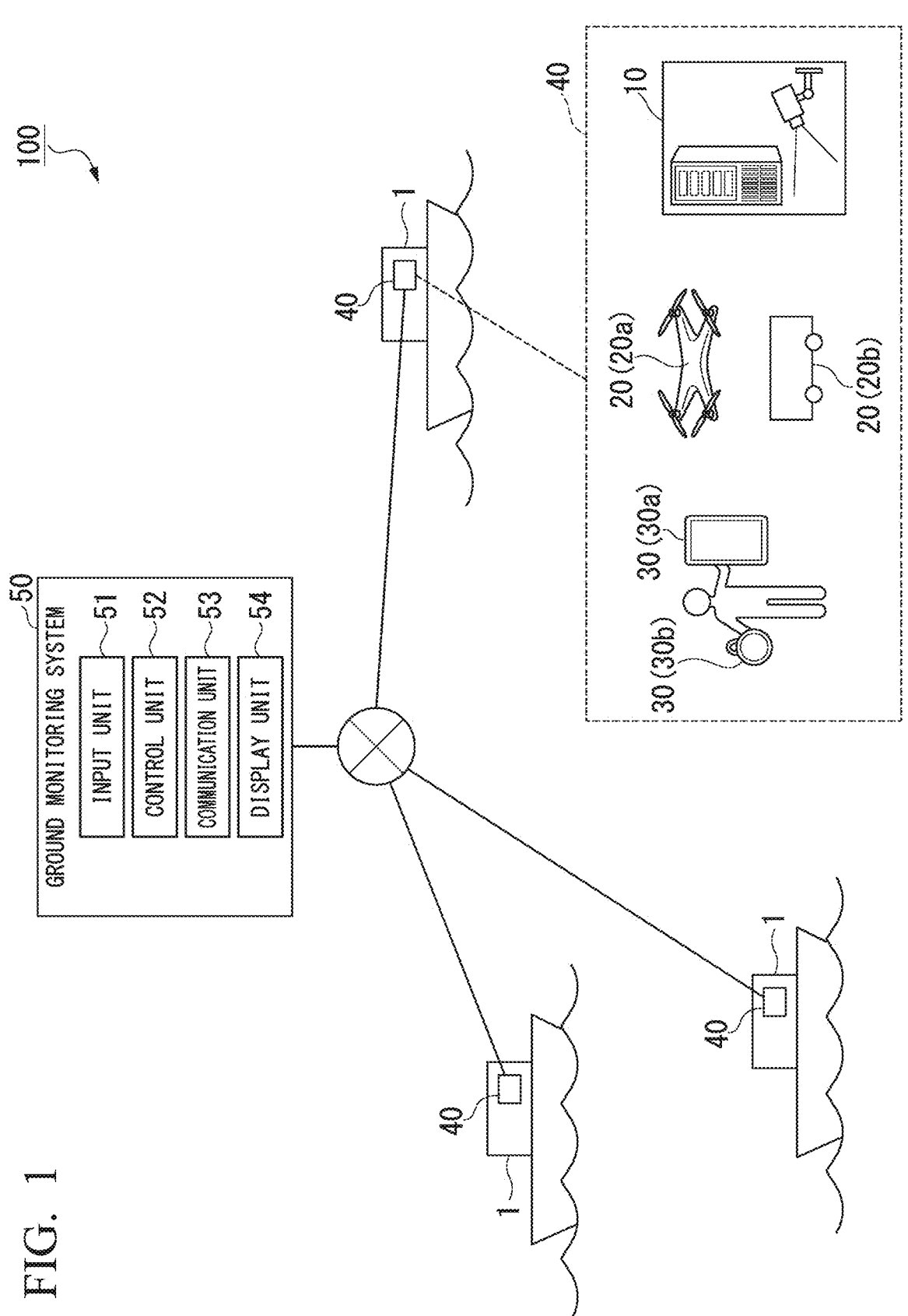
FIG. 1 is a first diagram showing an example of an evacuation guidance system according to an embodiment.
Figure 2:
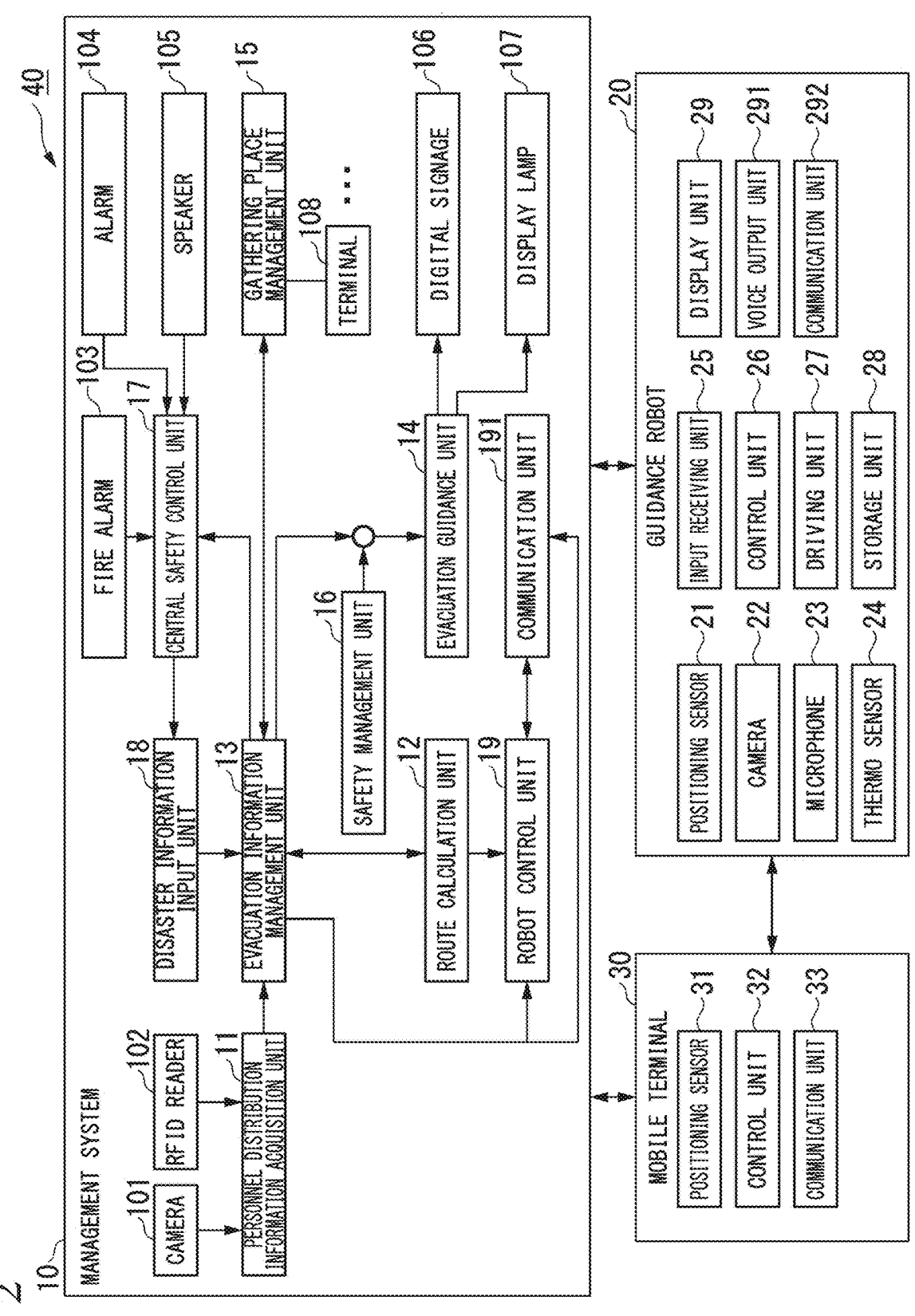
FIG. 2 is a second diagram showing an example of the evacuation guidance system according to the embodiment.

FIGS. 1 and 2 are a first diagram and a second diagram showing an example of the evacuation guidance system according to the embodiment, respectively.

An evacuation guidance system 100 includes an onboard system 40 that is mounted on one marine vessel 1 or each of a plurality of marine vessels 1 and a ground monitoring system 50 that is provided in a ground monitoring station. The ground monitoring system 50 and the onboard system 40 of each marine vessel 1 are connected via a network such that they can communicate with each other. The onboard system 40 supports evacuation guidance for passengers in the marine vessel 1. The onboard system 40 includes a management system 10 that manages the evacuation guidance for the passengers, a guidance robot 20 that is used for the evacuation guidance for the passengers, and a mobile terminal 30 that is possessed by the passenger. The management system 10 analyzes an aspect in the marine vessel which has been detected by various sensors, such as cameras and fire detectors, provided in each place of the marine vessel 1 to provide information for guiding the passengers or crew members to a safe evacuation site and performs the evacuation guidance for the passengers using the guidance robot 20. The guidance robot 20 finds a passenger who was late to evacuate and guides the passenger to the safe evacuation site, on the basis of an instruction from the management system 10. The guidance robot 20 can communicate with the mobile terminal 30 to check the position of the passenger who was late to escape or to check whether or not the passenger, who is being guided, has moved away from the guidance robot 20. The ground monitoring system 50 is a system that manages the onboard systems 40 of the plurality of marine vessels 1. For example, the ground monitoring system 50 acquires data related to the evacuation guidance in each marine vessel 1 from the onboard system 40. When there is an error or the like in the evacuation guidance performed by the onboard system 40, the ground monitoring system 50 transmits instruction information for improving the evacuation guidance to the onboard system 40. For example, the ground monitoring system 50 can issue an instruction for a movement route of the guidance robot 20 to the onboard system 40.

(Ground Monitoring System)

The ground monitoring system 50 includes an input unit 51, a control unit 52, a communication unit 53, and a display unit 54.

The input unit 51 is configured by an input device such as a keyboard, a mouse, a touch panel, or a button. The input unit 51 receives a user's input to the ground monitoring system 50. The input unit 51 outputs the content of the received input to the control unit 52.

The control unit 52 controls various processes performed by the ground monitoring system 50. For example, the control unit 52 performs display control of the display unit 54, communication control through the communication unit 53, and the like.

The communication unit 53 communicates with the onboard system 40. For example, the communication unit 53 acquires data related to the evacuation guidance from the onboard system 40 in real time.

The display unit 54 is configured by a display device such as a liquid crystal display. The display unit 54 can display any information on the basis of an instruction from the control unit 52. For example, the display unit 54 displays the data (for example, an image captured by a camera in the marine vessel) related to the evacuation guidance acquired from the onboard system 40.

An observer is present in the monitoring station. For example, when a disaster or the like occurs in any place of the marine vessel 1, the observer monitors the data displayed on the display unit 54 and inputs instruction information for reliably evacuating the passengers to the ground monitoring system 50. The input unit 51 receives the input of the instruction information by the observer, and the control unit 52 transmits the input instruction information to the onboard system 40 through the communication unit 53.

(Onboard System)

In the onboard system 40, the management system 10 and the guidance robot 20, and the guidance robot 20 and the mobile terminal 30 are connected by near field communication means, such as Ultra Wide Band (UWB), a wireless local area network (LAN), or Bluetooth, such that they can communicate with each other.

(Management System)

The management system 10 includes a personnel distribution information acquisition unit 11, a route calculation unit 12, an evacuation information management unit 13, an evacuation guidance unit 14, a gathering place management unit 15, a safety management unit 16, a central safety control unit 17, a disaster information input unit 18, a robot control unit 19, a communication unit 191, a camera 101, an RFID 102, a fire alarm 103, an alarm 104, a speaker 105, a digital signage 106, a display lamp 107, and a terminal 108. A plurality of cameras 101 and a plurality of RFID readers 102 are connected to the personnel distribution information acquisition unit 11. A plurality of digital signages 106 and a plurality of display lamps 107 are connected to the evacuation guidance unit 14. A plurality of terminals 108 are connected to the gathering place management unit 15. A plurality of fire alarms 103, a plurality of alarms 104, and a plurality of speakers 105 are connected to the central safety control unit 17.

The personnel distribution information acquisition unit 11 acquires passenger position information of a predetermined area in the marine vessel 1 on the basis of information from the plurality of cameras 101 provided in each place in the marine vessel 1. For example, the cameras 101 that detect the passengers and the crew members are provided in passages, steps, elevators, decks, and the like in the marine vessel 1. The cameras 101 output images captured at each position to the personnel distribution information acquisition unit 11. The personnel distribution information acquisition unit 11 analyzes the images to recognize the passengers and the crew members at each position in the marine vessel. For example, the personnel distribution information acquisition unit 11 recognizes a movement locus and a movement direction from the captured images to acquire the passenger position information and estimates the number of crew members and passengers in each area. The personnel distribution information acquisition unit 11 may recognize the faces of the passengers and the crew members from the captured images to recognize the movement locus of each person and acquire the passenger position information. The personnel distribution information acquisition unit 11 acquires position information of the passengers in the marine vessel on the basis of information read from a plurality of RFID readers 102 provided in the marine vessel. The passengers and the crew members carry ID cards provided with RFID tags. The RFID readers 102 are provided in each place in the marine vessel 1. The RFID reader 102 detects the RFID tag of the ID card to detect that the passenger or the crew member has passed nearby and outputs identification information of the RFID tag and the position where the RFID reader 102 is installed to the personnel distribution information acquisition unit 11. The personnel distribution information acquisition unit 11 acquires the number of passengers and crew members or personal information thereof in each place on the basis of the information acquired from the RFID readers 102. A configuration may be adopted in which each passenger has the mobile terminal 30 capable of measuring position information and the personnel distribution information acquisition unit 11 acquires identification information and position information of the mobile terminal 30 from the mobile terminal 30 possessed by each passenger. The personnel distribution information acquisition unit 11 ascertain that the passenger associated with the identification information of the mobile terminal 30 is present at the position indicated by the position information of the mobile terminal 30.

The disaster information input unit 18 sets passage passability information on the basis of disaster information including the occurrence of a disaster and the content of the disaster received from the central safety control unit 17 and outputs the passage passability information to the evacuation information management unit 13. The disaster information input unit 18 may automatically determine the passage passability information and input the passage passability information to the evacuation information management unit 13. Alternatively, the crew member may manually input the passage passability information.

The evacuation information management unit 13 outputs the passenger position information from the personnel distribution information acquisition unit 11 and the passage passability information from the disaster information input unit 18 to the route calculation unit 12.

The route calculation unit 12 formulates an evacuation route through which the passenger can evacuate to the evacuation site in the shortest time on the basis of the passenger position information and the passage passability information. Specifically, the route calculation unit 12 calculates, for example, a guidance evacuation direction to a plurality of evacuation sites, the number of passengers expected to evacuate to the plurality of evacuation sites, and an expected evacuation completion time when evacuation to the plurality of evacuation sites is completed on the basis of the passenger position information and the passage passability information and outputs the information to the evacuation information management unit 13. The route calculation unit 12 formulates a route for picking up the passenger who was late to escape on the basis of the passenger position information and the passage passability information and formulates a route for guiding the passenger to the evacuation site. The route calculation unit 12 outputs information of the formulated route and position information of the place where the passenger who was late to escape is present to the robot control unit 19.

The evacuation guidance unit 14 changes evacuation guidance displays (the digital signage 106 and the display lamp 107) provided in the passages in the marine vessel on the basis of the evacuation route that has been output by the evacuation information management unit 13 and approved by the safety management unit 16. For example, the evacuation guidance unit 14 changes the evacuation guidance displays of the digital signage 106 and the display lamp 107 such that evacuation is performed in the shortest time.

The safety management unit 16 approves (disapproves) the evacuation route output to the evacuation guidance unit 14 by the evacuation information management unit 13. In practice, a captain or a crew member equivalent to a safety management supervisor approves (disapproves) the evacuation route.

The gathering place management unit 15 assigns lifeboats to be boarded to a plurality of passengers or crew members who have evacuated to the plurality of evacuation sites. The evacuation information management unit 13 acquires, for example, the evacuation route and the personal information of the passengers and the crew members (the identification number of the RFID acquired through the RFID reader 102, a name, gender, and age associated with the identification information, and whether or not support is required) from the personnel distribution information acquisition unit 11 and outputs them to the gathering place management unit 15.

The terminal 108 is connected to the gathering place management unit 15, and the crew member in the evacuation site inputs the passenger who is to board the lifeboat through the terminal 108. The input passenger information is output to the gathering place management unit 15.

The central safety control unit 17 is connected to the fire alarm 103, the alarm 104, and the speaker 105. When a disaster occurs and a fire occurs in the marine vessel, the fire alarm 103 operates to notify the central safety control unit 17 of the occurrence of the fire. The central safety control unit 17 recognizes the fire in the marine vessel, operates the alarm 104, and makes an emergency evacuation announcement through the speaker 105. The central safety control unit 17 outputs disaster information, such as the occurrence of the fire, an occurrence position, and the scale of the fire, to the disaster information input unit 18. Information, such as the evacuation route, is input from the evacuation information management unit 13 to the central safety control unit 17.

The robot control unit 19 controls the guidance robot 20 on the basis of the route information for picking up the passenger who was late to escape, which has been acquired from the route calculation unit 12, and guidance information indicating the route for guiding the passenger to the evacuation site. For example, the robot control unit 19 calculates position information (waypoint) of the route through which the guidance robot 20 passes and transmits the waypoint to the guidance robot 20 through the communication unit 191. Alternatively, the robot control unit 19 transmits position information of a movement destination (a place where the passenger who was late to escape is present or the evacuation site) of the guidance robot 20 to the guidance robot 20 through the communication unit 191.

The robot control unit 19 acquires the route information of the guidance robot 20 or the position information of the destination from the ground monitoring system 50 through the communication unit 191, calculates the position information (waypoint) of the route through which the guidance robot 20 passes, and transmits the position information to the guidance robot through the communication unit 191.

The communication unit 191 communicates with the ground monitoring system 50, the guidance robot 20, and the mobile terminal 30. For example, the communication unit 191 acquires information of the route through which the guidance robot 20 is moved from the robot control unit 19, acquires the passenger position information or the passage passability information from the evacuation information management unit 13, and transmits the acquired information to the ground monitoring system 50. In the ground monitoring station, the observer compares and checks the route of the guidance robot 20 transmitted from the onboard system 40 and the passenger position information or the passage passability information. In a case where the route is not appropriate, the observer inputs the corrected route to the ground monitoring system 50. The ground monitoring system 50 transmits the input corrected route to the onboard system 40 (management system 10). The communication unit 191 outputs the corrected route to the robot control unit 19. The robot control unit 19 calculates the waypoint of the guidance robot 20 again on the basis of the corrected route and transmits the corrected waypoint to the guidance robot 20 through the communication unit 191. The communication unit 191 acquires the position information of the mobile terminal 30 from the mobile terminal 30 and outputs the acquired position information to the personnel distribution information acquisition unit 11.

(Guidance Robot)

The guidance robot 20 is an unmanned mobile body whose movement can be controlled by a remote operation or automatic control, such as a flying robot 20*a* or a ground robot 20*b*. The onboard system 40 includes one or a plurality of guidance robots 20. The guidance robot 20 includes a positioning sensor 21, a camera 22, a microphone 23, a thermo sensor 24, an input receiving unit 25, a control unit 26, a driving unit 27, a storage unit 28, a display unit 29, a voice output unit 291, and a communication unit 292.

The positioning sensor 21 measures position information of the guidance robot 20. The positioning sensor 21 is a receiver of a satellite positioning system such as a global positioning system (GPS) receiver.

The camera 22 images an aspect around the guidance robot 20.

The microphone 23 picks up voice around the guidance robot 20.

The thermo sensor 24 is a human detecting sensor or an infrared camera (thermography camera) that detects a person present around the guidance robot 20.

The input receiving unit 25 is configured by an input device such as a touch panel or a button. The input receiving unit 25 receives an input by the passenger or the crew member. The input unit 25 outputs the content of the received input to the control unit 26.

The control unit 26 controls the operation of the guidance robot 20. For example, a "search mode" and an "evacuation guidance mode" are prepared as operation modes of the guidance robot 20. In the search mode, the control unit 26 controls the driving unit 27 such that the guidance robot 20 is moved to the position of the passenger to be evacuated. In the evacuation guidance mode, the control unit 26 moves the guidance robot 20 to guide the passenger to the evacuation site. The control unit 26 performs display control on the display unit 29, voice information output control on the voice output unit 291, communication control by the communication unit 292, analysis of whether or not a person is included in an image captured by the camera 22, analysis of whether the sound picked up by the microphone 23 includes a human voice, analysis of information detected by the thermo sensor 24, and the like.

The driving unit 27 is a mechanism for moving the guidance robot 20 including a propeller (flying type), a tire (ground type), and the like.

The storage unit 28 is configured by a storage device, such as an HDD or a flash memory, and stores information, such as the position information of the movement destination or the waypoint. The waypoint means point information (position information) on the route. For example, each waypoint on the route can be given to the guidance robot 20, and an instruction to follow the waypoints can be issued to the guidance robot 20 to move the robot 20 along a desired route.

The display unit 29 is configured by a display device such as a liquid crystal display. A message or the like for the passenger to be guided to evacuate is displayed on the display unit 29.

The voice output unit 291 is configured by a speaker and outputs a message or the like to the passenger to be guided to evacuate by voice.

The communication unit 292 communicates with the management system 10 and the mobile terminal 30. For example, the communication unit 292 acquires the information of the waypoint from the management system 10. For example, the communication unit 292 acquires the position information of the mobile terminal 30 from the mobile terminal 30.

(Mobile Terminal)

The mobile terminal 30 is a smartphone 30*a* or a tag device 30*b* used for the purpose of loss prevention or the like. For example, the mobile terminal 30 is configured to be linked to the guidance robot 20 in advance such that the position information thereof can be recognized by the guidance robot 20 and to transmit the position information of the mobile terminal 30 to the guidance robot 20. The mobile terminal 30 is lent to the passenger when the passenger boards the marine vessel. At that time, the identification information of the mobile terminal 30 and the personal information of the passenger are registered in the management system 10 in association with each other. Information in which the identification information of the mobile terminal 30 and the personal information of the passenger are associated with each other is transmitted to the guidance robot 20 and is registered in the storage unit 28 in advance. The mobile terminal 30 may be configured integrally with the ID card with the RFID tag. The mobile terminal 30 includes a positioning sensor 31, a control unit 32, and a communication unit 33.

The positioning sensor 31 measures the position information of the mobile terminal 30. The positioning sensor 31 is, for example, a GPS receiver.

The control unit 32 transmits the position information of the mobile terminal 30 measured by the positioning sensor 31 to the guidance robot 20 and the management system 10 through the communication unit 33.

The communication unit 33 communicates with the management system 10 and the guidance robot 20.

(Operation)

Next, the operation of the evacuation guidance system 100 will be described.

Figure 3:
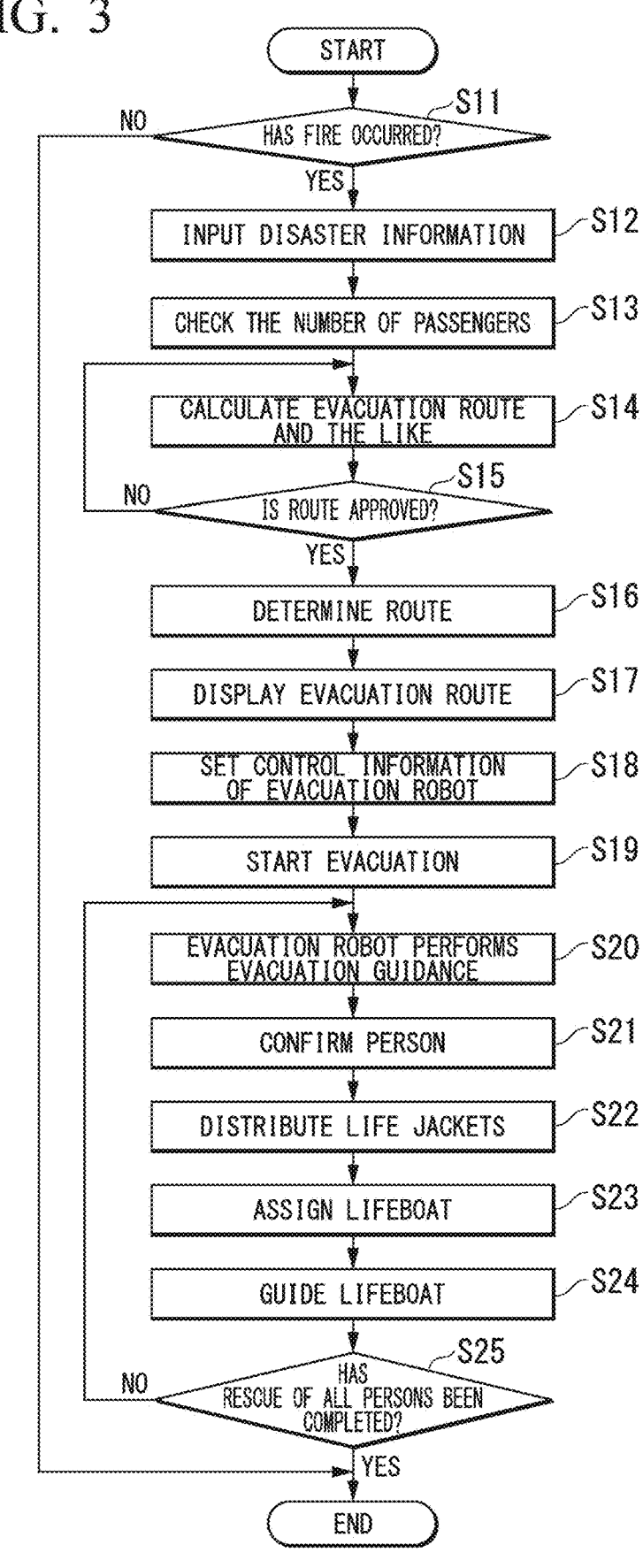
FIG. 3 is a flowchart showing an example of an evacuation guidance process according to the embodiment.
Figure 4:
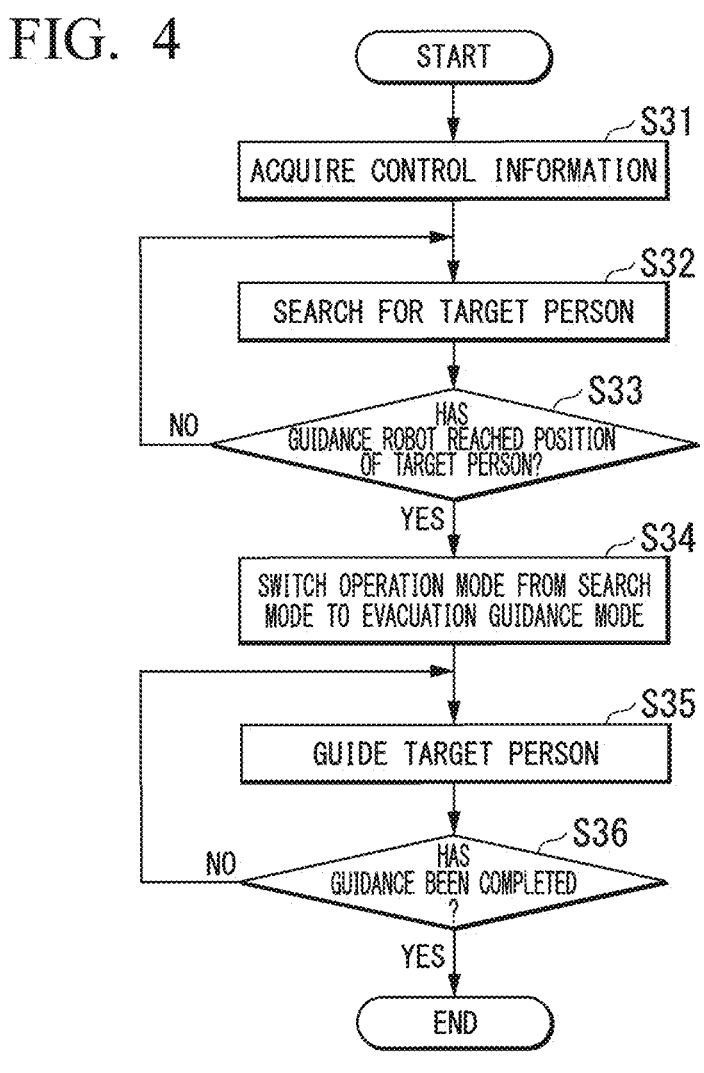
FIG. 4 is a flowchart showing an example of control of a guidance robot according to the embodiment.

FIG. 3 is a flowchart showing an example of an evacuation guidance process according to the embodiment.

In an evacuation guidance method in the marine vessel 1 according to this embodiment, the evacuation route is formulated from the passenger position information and the disaster information, and the evacuation guidance displays installed in the passages in the marine vessel are changed on the basis of the evacuation route to guide the passengers. In addition, the guidance robot 20 is controlled to perform the evacuation guidance for a passenger who is concerned about being late to evacuate.

First, the central safety control unit 17 determines whether or not a fire has occurred in the marine vessel, on the basis of the operation of the fire alarm 103 or a report from the crew member or the passenger (Step S11). In a case where no fire has occurred (Step S11; No), the process in the flowchart shown in FIG. 3 is ended. In a case where a fire has occurred (Step S11; Yes), the central safety control unit 17 operates the alarm 104, makes an emergency evacuation announcement through the speaker 105, and inputs disaster information related to the occurrence of the fire to the disaster information input unit 18 (Step S12). The disaster information includes information such as the occurrence place (the installation place of the fire alarm 103 that has detected the fire or the occurrence place reported by the crew member), scale, and occurrence time of the fire. The disaster information input unit 18 acquires the disaster information and sets the passage passability information. For example, the disaster information input unit 18 performs setting such that a passage including the occurrence place of the fire is unpassable and the other passages are passable. The disaster information input unit 18 outputs the disaster information and the passage passability information to the evacuation information management unit 13 (Step S13). When the disaster information is acquired from the disaster information input unit 18, the evacuation information management unit 13 outputs a command to the personnel distribution information acquisition unit 11. The personnel distribution information acquisition unit 11 acquires passenger position information of a predetermined area in the marine vessel on the basis of the information from the plurality of cameras 101 and RFID readers 102. For example, the personnel distribution information acquisition unit 11 processes the image acquired by the camera 101 and estimates the number of crew members and passengers in each area. At this time, the personnel distribution information acquisition unit 11 may collate face image data or the like of the crew members or the like registered in advance to recognize the names of the crew members. The personnel distribution information acquisition unit 11 ascertains the number of crew members and passengers or the names thereof in each area on the basis of signals received from the RFID reader 102 provided at the entrance of each area. In addition to the above, the personnel distribution information acquisition unit 11 may acquire the position information from the mobile terminal 30 to ascertain the position of the passenger and may ascertain the personal information associated with the mobile terminal 30. The number of persons may be estimated using all of these methods or may be estimated by any one or two of these methods depending on, for example, a disaster situation or the like.

Then, the evacuation information management unit 13 outputs the passenger position information from the personnel distribution information acquisition unit 11 and the passage passability information from the disaster information input unit 18 to the route calculation unit 12. The route calculation unit 12 calculates the evacuation route or the like on the basis of the passenger position information and the passage passability information (Step S14). This evacuation route is an evacuation route that enables a large number of passengers to safely evacuate to the evacuation site in the shortest time. The guidance evacuation direction, the number of passengers expected to evacuate to the evacuation site, the expected evacuation completion time point when evacuation to the evacuation site is completed, and the expected evacuation completion time until evacuation to the evacuation site is completed are calculated. The route calculation unit 12 specifies a passenger having a high possibility of being late to escape and calculates an evacuation route for each specified passenger and a route for picking up the passenger. For example, the route calculation unit 12 specifies, as the passenger having a high possibility of being late to escape, a passenger who is present at a position away from a plurality of passengers, a passenger near the place where the disaster has occurred, an aged person, a disabled person, or the like. For each of these passengers, the route calculation unit 12 connects passable passages from the storage position of the guidance robot 20 to a position where a target passenger is present on the basis of the passenger position information of the passenger and the passage passability information to calculate a route for picking up the passenger and connects passable passages from the position where the passenger is present to the nearest evacuation site to calculate the evacuation route. The route calculation unit 12 outputs the calculated evacuation route for a large number of passengers to the evacuation information management unit 13 and outputs route information for the passenger having a high possibility of being late to escape and the identification information or personal information of the passenger to the robot control unit 19.

In the description of this flowchart, the evacuation guidance by the guidance robot 20 is intended for the passenger who is concerned about being late to escape. However, the present invention is not limited thereto, and the guidance robot 20 can be used to perform the evacuation guidance on a large number of passengers. In this case, the route on which the guidance robot 20 picks up the passenger and the guidance route through which the guidance robot 20 guides the passenger to the evacuation site are calculated for the place where a large number of passengers to be evacuated are present and the evacuation site of the passengers.

Then, the evacuation information management unit 13 outputs the route calculated by the route calculation unit 12 to the evacuation guidance unit 14. At this time, the safety management unit 16 approves or disapproves the evacuation route (Step S15). Specifically, when the captain or the safety management supervisor does not approve the evacuation route (Step S15; No), the route calculation unit 12 recalculates the evacuation route or the like. On the other hand, when the captain or the like approves the evacuation route (Step S15; Yes), the evacuation route is determined as the approved evacuation route (Step S16). The captain may also determine whether to approve or disapprove the route for picking up the passenger or the guidance route. The evacuation guidance unit 14 changes the display of the digital signage 106 and the display lamp 107 provided in each place of the marine vessel on the basis of the evacuation route (the guidance evacuation direction to the evacuation site) output by the evacuation information management unit 13 to perform display to guide the passengers nearby the place to the evacuation site (Step S17). At this time, supporting crew members are placed.

The robot control unit 19 selects a passenger (or one group) with high priority from the passengers who are likely to be late to escape and calculates control information of the guidance robot 20 on the basis of information of the route for picking up the passenger (target person) and the guidance route to the evacuation site. For example, the robot control unit 19 calculates a waypoint from the storage place of the guidance robot 20 to the place in which the target person is present. Similarly, the robot control unit 19 calculates a waypoint from the place where the target person is present to the evacuation site. The robot control unit 19 transmits the control information (waypoint) calculated for the passenger who is concerned about being late to escape, the identification information or personal information of the target person, and the like to the guidance robot 20 through the communication unit 191 and sets the information (Step S18). The passenger with high priority is, for example, a passenger who is present in a place around which the digital signage 106 or the like is not installed, a passenger who is present in a place where the crew member is not able to pick up the passenger due to lack of personnel, danger, or the like, an aged person, a disabled person, a passenger who is actually late to escape, or the like.

When Steps S17 and S18 are completed, the evacuation of the passengers is started. A large number of passengers start evacuating to the evacuation site by the display of the digital signage 106 and the display lamp 107, onboard broadcasting, or the guidance of the crew members (Step S19). Even after the start of the evacuation, the disaster information input unit 18 acquires the latest disaster information to update the passage passability information, and the personnel distribution information acquisition unit 11 acquires the latest passenger position information. These information items are output to the evacuation information management unit 13.

(Evacuation Guidance by Guidance Robot)

The guidance robot 20 performs the evacuation guidance for the passenger who is concerned about being late to escape on the basis of the setting in Step S18 (Step S20). Here, the control of the guidance robot 20 will be described with reference to FIG. 4. First, the control unit 26 of the guidance robot 20 acquires the control information set in Step S18 through the communication unit 292 (Step S31). Then, the control unit 26 sets the operation mode to the "search mode" to search for the target person while controlling the driving unit 27 (Step S32). The control unit 26 moves an own device (guidance robot 20) to follow the waypoint from the storage place to the place where the passenger is present on the basis of the position information of the guidance robot 20 measured by the positioning sensor 21 such that the own device is moved to the place where the target person is present. During this period, information, such as the image captured by the camera 22 and the voice picked up by the microphone 23, is transmitted to the management system 10 by the communication unit 292. The position information of the mobile terminal 30 possessed by the target person is transmitted to the management system 10 by the communication unit 33. These information items are transmitted from the management system 10 to the ground monitoring system 50 in real time. The image captured by each camera 101 provided in each place in the marine vessel and the information detected by the RFID reader 102 are also transmitted from the management system 10 to the ground monitoring system 50 in real time. In the ground monitoring system 50, the observer monitors the images captured by the cameras 22 and 101 and the like, ascertains a situation of a wide area in the marine vessel and an aspect around the guidance robot 20, and determines, for example, whether or not the route calculated in advance is appropriate. For example, in a case where the disaster situation changes or the target person moves, the observer sets a new route for picking up the target person in the ground monitoring system 50. The ground monitoring system 50 transmits information of the newly set route to the management system 10. In the management system 10, the robot control unit 19 acquires the route information through the communication unit 191, calculates a waypoint, and transmits the calculated waypoint to the guidance robot 20. The guidance robot 20 is moved to the position where the target person is present on the basis of the corrected route information.

While the guidance robot 20 arrives at the place where the target person is present, the control unit 26 may, for example, display a message "The robot for evacuation guidance is passing through." or a message "The robot is on its way to pick up a person who is unable to evacuate." on the display unit 29 or may output a message having the same content as described above as the voice information from the voice output unit 291. Therefore, it is possible to make the passengers know the passage of the guidance robot 20 and to facilitate the passage of the guidance robot 20 that is moved in a direction opposite to the evacuation direction of a plurality of evacuees. It is possible to prevent a large number of evacuees from moving in the movement direction of the guidance robot 20.

When the guidance robot 20 approaches the place where the target person is present, the control unit 26 may move the guidance robot 20 to approach the mobile terminal 30 on the basis of the position information of the mobile terminal 30 transmitted from the mobile terminal 30 possessed by the target person and the position information of the guidance robot 20 measured by the positioning sensor 21. At this time, the control unit 26 displays, for example, a message "The robot came to pick up Mr. ○" on the display unit 29 or may output a message having the same content as described above as the voice information from the voice output unit 291. The control unit 26 may take measures to attract the attention of the target person. For example, the control unit 26 displays a background color of the display unit 29 as a special color. Therefore, it is possible to notify the target person of the presence of the guidance robot 20.

In case the target person arrives at a place where it is not possible to see the guidance robot 20 (for example, the next room or the like) although the position information is very close, the control of the guidance robot 20 may be configured to be switched from automatic control by the control unit 26 to manual operation by the observer on land when it is not possible to determine that the guidance robot 20 has reached the position of the target person within a predetermined time using methods (2) to (6) described below even though the distance between the guidance robot 20 and the mobile terminal 30 is within the predetermined range. The observer on land uses the ground monitoring system 50 to guide the guidance robot 20 to the position where the target person is present, on the basis of map information in the marine vessel and the position information of the guidance robot 20 and the mobile terminal 30. In this way, the guidance robot 20 is moved to a position where the target person can see the guidance robot 20.

Then, the control unit 26 determines whether or not the guidance robot 20 has reached the position of the target person (Step S33). (1) For example, the control unit 26 may determine that the guidance robot 20 has reached the position of the target person when the position information of the guidance robot 20 and the position information of the mobile terminal 30 are matched with each other or approach a range in which they can be considered to be matched with each other. (2) For example, when a difference between the position information of the guidance robot 20 and the position information of the mobile terminal 30 is within a predetermined range, the control unit 26 may display information, such as "Please touch the button" (when the button is provided) or "Please touch the screen" (in a case where the display unit 29 is a touch panel type), on the display unit 29 or may output voice information having the same content as described above from the voice output unit 291. When a touch on the button or the screen is detected, the control unit 26 may determine that the guidance robot 20 has reached the position of the target person. (3) For example, when the difference between the position information of the guidance robot 20 and the position information of the mobile terminal 30 is within the predetermined range, the control unit 26 may output voice information, such as "Mr. ○ please reply" or "Please wave your hand", from the voice output unit 291. When it is possible to acquire the voice of the target person through the microphone 23 or to image an aspect in which the target person waves the hand with the camera 22, the control unit 26 may determine that the guidance robot 20 has reached the position of the target person. Alternatively, the control unit 26 may determine that the guidance robot 20 has reached the position of the target person even without calling when an image captured by the camera 22 is analyzed and a person is included in the image or when the voice of the person is included in the voice information picked up by the microphone 23. (4) For example, the control unit 26 may transmit the image captured by the camera 22 or the voice information picked up by the microphone 23 to the management system 10 using the communication unit 292, and the management system 10 may transmit the information to the ground monitoring system 50. Then, the observer on land confirms the image or the voice information output by the monitoring system 50 and inputs the confirmed information to the ground monitoring system 50. The ground monitoring system 50 transmits the information confirmed by the observer to the management system 10. Then, when acquiring the information confirmed by the observer from the management system 10, the control unit 26 may determine that the own device has reached the position of the target person. (5) For example, when the difference between the position information of the guidance robot 20 and the position information of the mobile terminal 30 is within the predetermined range, and in a case where it is determined that the target is a person on the basis of thermography detected by an infrared camera (thermo sensor 24) or in a case where the voice output unit 291 outputs voice information, such as "Please wave your hand", and the movement of the person can be confirmed by the thermography, the control unit 26 may determine that the guidance robot 20 has reached the position of the target person. (6) The control unit 26 may perform these methods (2) to (5) in order and may determine that the guidance robot 20 has reached the position of the target person when any one of the conditions is satisfied.

There is a possibility that the person who was late to evacuate will have some kind of trouble, will not be able to make a sound due to smoke or heat filling the marine vessel, or will not be able to see the display on the display unit 29 or the like. The preparation of a plurality of methods for confirming the target person, such as contact, conversation, and gestures, as in the methods (2) to (6) makes it possible to reliably confirm the target person.

In a case where it is determined that the guidance robot 20 has not reached the position of the target person (Step S33; No), the control unit 26 continues to search for the target person (Step S32). When it is determined that the guidance robot 20 has reached the position of the target person (Step S33; Yes), the control unit 26 switches the operation mode of the guidance robot 20 from the "search mode" to the "evacuation guidance mode" (Step S34). When the operation mode is switched to the "evacuation guidance mode", the guidance robot 20 guides the target person to the evacuation site (Step S35). The control unit 26 moves the guidance robot 20 to follow the waypoints to the evacuation site on the basis of the control information acquired in Step S31. The control unit 26 may display the background color of the display unit 29 as a conspicuous color or may output predetermined voice information from the voice output unit 291 at regular intervals such that the target person does not lose sight of the guidance robot 20 during evacuation guidance. During the evacuation guidance, the control unit 26 monitors the position information measured by the positioning sensor 21 and the position information of the mobile terminal 30 and moves while adjusting a movement speed such that the difference between the position information items is within a predetermined range. Then, when the difference between the position information of the guidance robot 20 and the position information of the mobile terminal 30 is out of the range, the control unit 26 may output voice information, such as "Please do not move away from the robot", from the voice output unit 291. Alternatively, the control unit 26 may notify the ground monitoring system 50 that the target person has moved away through the management system 10. The observer on land may input instruction information for guiding the guidance robot 20 to the position of the target person to the ground monitoring system 50 on the basis of the images captured by the cameras 22 and 101 or the position information of the mobile terminal 30. In a case where the instruction information is input, the control unit 26 acquires the instruction information through the management system 10 and moves to the position of the target person. Alternatively, during the evacuation guidance, when a predetermined period of time has elapsed since the difference between the position information of the guidance robot 20 and the position information of the mobile terminal 30 was out of the range, the control unit 26 may switch the operation mode to the "search mode" again and trace the guidance route traveled so far in the reverse direction to search for the target person.

During guidance to the evacuation site, the image captured by the camera 22, the voice picked up by the microphone 23, the position information of the guidance robot 20, and the position information of the mobile terminal 30 are transmitted to the management system 10 and then transmitted to the ground monitoring system 50 in real time. In the ground monitoring system 50, the observer monitors the images captured by the camera 22 and the like and, for example, checks whether the guidance route is appropriate, whether the target person is near the guidance robot 20, and the facial expression or degree of fatigue of the target person. For example, when it is determined that another guidance route (for example, an easy travel route, a shorter route, or the like) is appropriate according to a change in the disaster situation or the state of the target person, the observer sets a new appropriate guidance route and transmits the new guidance route to the management system 10 through the ground monitoring system 50. In the management system 10, the robot control unit 19 acquires the new guidance route through the communication unit 191, calculates control information, and transmits the control information to the guidance robot 20. When the observer determines that the target person needs to be assisted, the observer may instruct the crew member of the marine vessel 1 to go for support or may have a conversation with the target person using the voice output unit 291 or the microphone 23 of the guidance robot 20 through the ground monitoring system 50 and the management system 10 to provide encouragement and guidance. In this way, the guidance robot 20 guides the target person to the evacuation site. The control unit 26 determines that the guidance of the target person has been completed when both the position information of the guidance robot 20 and the position information of the mobile terminal 30 possessed by the target person reach the evacuation site (Step S36). While the guidance of the target person is not completed (Step S36; No), the control unit 26 continues the guidance of the target person. When the guidance is completed (Step S36; Yes), the control unit 26 performs the process described with reference to FIG. 4 on the next target person. For example, the robot control unit 19 selects a passenger having the next highest priority among the passengers specified as the passengers having a high possibility of being late to escape and repeats the process from Step S31. When evacuation is actually started, there is a possibility that a passenger who was actually late to escape will be present, in addition to the passengers specified as the passengers having a high possibility of being late to escape at the beginning (Step S14). The route calculation unit 12 acquires the latest passenger position information updated by the personnel distribution information acquisition unit 11 from the evacuation information management unit 13, specifies a passenger who was late to escape, and calculates a route for picking up the passenger and a guidance route to the evacuation site. The robot control unit 19 may direct the guidance robot 20 to perform the evacuation guidance for a passenger who has been newly specified and was actually late to escape.

When the passenger or the crew member arrives at the evacuation site, the management system 10 confirms the person (Step S21). Specifically, the RFID reader 102 provided at the entrance of the evacuation site detects the RFID tag of the ID card carried by the passenger or the like to recognize the passenger who has been completely evacuated and outputs the information of the passenger to the personnel distribution information acquisition unit 11. Alternatively, the personnel distribution information acquisition unit 11 may recognize the passenger who has been completely evacuated on the basis of the identification information and the position information of the mobile terminal 30. The personnel distribution information acquisition unit 11 counts the number of passengers and crew members evacuated to the evacuation site.

Each evacuation site is equipped with life jackets corresponding to the number of passengers and crew members who are predicted to evacuate. The crew members distribute the life jackets to the evacuated passengers (Step S22). The gathering place management unit 15 assigns the lifeboats to the passengers or the crew members who have evacuated to a plurality of evacuation sites (Step S23). The crew member inputs the number of passengers to board the lifeboat using the terminal 108 to perform the assignment. The gathering place management unit 15 counts the number of passengers input from the terminal 108. When the number of passengers reaches the capacity of the lifeboat, the gathering place management unit 15 designates another lifeboat and assigns the lifeboat in the same manner.

When the assignment of the lifeboat is completed, the crew member guides boarding to the assigned lifeboat (Step S24). Then, the management system 10 determines whether or not the rescue of all persons has been completed (Step S25). For example, when the assignment of the lifeboats to all of the passengers and the crew members is completed, it is determined that the rescue of all of the persons has been completed. Here, when it is determined that the rescue of all of the persons has not been completed (Step S25; No), the processes in Step S20 and the subsequent steps are repeated. In this way, the evacuation guidance for the passenger who was late to escape by the guidance robot 20 is continuously performed. On the other hand, when it is determined that the rescue of all of the persons has been completed (Step S25; Yes), the process is completed.

(Effect)

As described above, according to this embodiment, it is possible to perform the evacuation guidance for the passengers using the guidance robot 20. Therefore, it is possible to reduce the number of crew members in evacuation guidance. In addition, it is possible to search the place where people cannot enter due to the influence of fire and the like and to support evacuation from the place. In a case where the passenger who was late to escape is searched for, the crew member needs to search for the passenger in a direction opposite to the evacuation direction. However, since the mobile robot (particularly, a flying type) is used, the influence of reverse movement is eliminated, and it is possible to perform the evacuation guidance using the guidance robot 20 without hindering the smooth evacuation of the passengers. In recent years, there has been a demand for an unmanned or labor-saving system in the operation of the marine vessel. In the evacuation guidance performed when a disaster occurs, when the behavior of the crew member is limited or there is a shortage of crew members, some passengers may be late to escape. This tendency is more pronounced in the case of a marine vessel to which the unmanned or labor-saving system is applied. Even in this case, according to this embodiment, the use of the guidance robot 20 makes it possible to achieve reliable evacuation guidance. In other words, the guidance robot 20 can contribute to achieving an unmanned or labor-saving marine vessel.

The ground monitoring system 50 can monitor and manage the evacuation guidance in a plurality of marine vessels. Therefore, it is possible to contribute to achieving the unmanned or labor-saving marine vessel.

Figure 5:
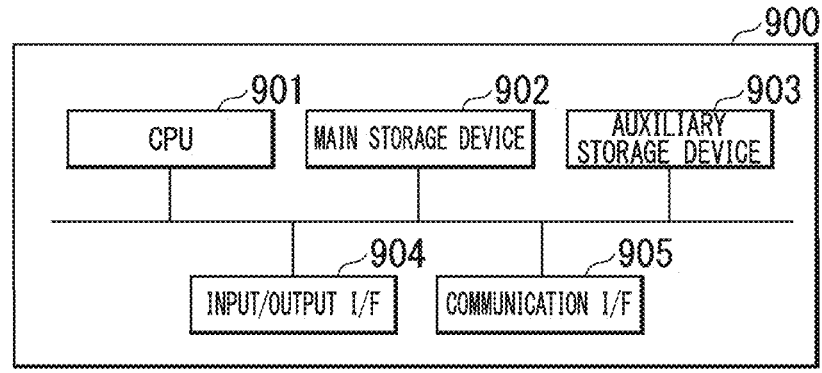
FIG. 5 is a diagram showing an example of a hardware configuration of the evacuation guidance system according to the embodiment.

FIG. 5 is a block diagram showing an example of a hardware configuration of the evacuation guidance system according to the embodiment.

A computer 900 includes a CPU 901, a main storage device 902, an auxiliary storage device 903, an input/output interface 904, and a communication interface 905.

The personnel distribution information acquisition unit 11, the route calculation unit 12, the evacuation information management unit 13, the evacuation guidance unit 14, the gathering place management unit 15, the safety management unit 16, the central safety control unit 17, the disaster information input unit 18, the robot control unit 19, the terminal 108 of the management system 10, the control unit 26 of the guidance robot 20, the mobile terminal 30, and the ground monitoring system 50 are implemented in the computer 900. In addition, each function described above is stored in the auxiliary storage device 903 in the form of a program. The CPU 901 reads the program from the auxiliary storage device 903, deploys the program in the main storage device 902, and executes the above-described processes according to the program. The CPU 901 secures a storage area in the main storage device 902 according to the program. The CPU 901 secures a storage area for storing data being processed in the auxiliary storage device 903 according to the program.

A program for implementing all or some of the functions of the management system 10, the guidance robot 20, the mobile terminal 30, and the ground monitoring system 50 may be recorded on a computer-readable recording medium. The program recorded on the recording medium may be read into a computer system and executed to perform processes by each functional unit. Here, it is assumed that the term "computer system" described here includes an OS and hardware such as a peripheral device. It is assumed that the "computer system" also includes a homepage providing environment (or a display environment) in a case where a WWW system is used. The term "computer-readable recording medium" refers to a portable medium, such as a CD, a DVD, or a USB, or a storage device, such as a hard disk drive, provided in the computer system. In a case where this program is distributed to the computer 900 by a communication line, the computer 900 which has received the distribution of the program may deploy the program into the main storage device 902 to perform the above-described processes. The above-described program may be a program for implementing some of the above-mentioned functions or a program for further implementing the above-mentioned functions in combination with the program already recorded on the computer system.

Some embodiments of the present disclosure have been described above. However, all of these embodiments are only examples and are not intended to limit the scope of the invention. These embodiments can be implemented in various other forms, and various omissions, replacements, and changes can be made without departing from the gist of the invention. These embodiments and modifications thereof are included in the scope of the invention described in the claims and the equivalent scope thereof, as well as in the scope and gist of the invention.

For example, the observer performs monitoring using the ground monitoring system 50. However, a system having the same functions may be constructed in a plurality of marine vessels 1, and the monitoring of the guidance robot and the like may be performed in the marine vessel 1. In the flowchart shown in FIG. 3, the processes in Steps S18 and S20 are performed on the passenger who is likely to be late to escape or on a small number of persons (for example, one by one). However, for example, in a case where there are no passengers who are concerned about being late to escape or immediately after a disaster occurs, the guidance robot 20 may be directed to a hall, a lounge, a cafeteria, or the like where a large number of passengers gather to perform evacuation guidance for a large number of passengers. Alternatively, the guidance robot 20 may be installed in advance near a cabin with a higher class depending on the class of the cabin. When a disaster occurs, the guidance robot 20 may start the evacuation guidance for surrounding passengers. On the contrary, staff may take measures for the evacuation guidance for the cabin with a higher class, and the guidance robot 20 may perform the evacuation guidance for the other cabins.

Supplementary Notes

For example, the evacuation guidance system and the evacuation guidance method described in each embodiment are understood as follows.

(1) According to a first aspect, there is provided an evacuation guidance system (40, 100) including: a management system (10) including a disaster information acquisition unit (18) configured to acquire information of a disaster which has occurred in a marine vessel, a personnel distribution information acquisition unit (11) configured to acquire position information of passengers in the marine vessel on the basis of information of a sensor which detects a person, a route calculation unit (12) configured to formulate an evacuation route on the basis of passage passability information which is set from the position information of the passengers from the personnel distribution information acquisition unit and the information of the disaster, and a guidance target passenger specification unit (12, 19) configured to specify a passenger to be subjected to evacuation guidance and a position of the passenger from the position information of the passengers acquired by the personnel distribution information acquisition unit and the information of the disaster; and a mobile body (20) including a control unit (26) configured to move an own device to the position of the passenger specified by the guidance target passenger specification unit on the basis of the specified passenger and the position of the specified passenger and to move the own device along the evacuation route (guidance route) calculated by the route calculation unit to guide the passenger when the own device is moved to the position of the passenger.

Therefore, since the evacuation guidance can be performed for the passengers by the mobile body, it is possible to reduce the number of crew members required for the evacuation guidance. In other words, even in an unmanned or labor-saving marine vessel, the evacuation guidance can be performed for the passengers by the mobile body.

(2) According to a second aspect, in the evacuation guidance system (40, 100) according to (1), the mobile body (20) includes an input unit (input receiving unit 25) configured to receive input of information in a contact manner and an output unit (the display unit 29 and the voice output unit 291). The output unit outputs information requesting input of predetermined information in the contact manner through the input unit when a position of the own device is within a predetermined range from the position of the passenger. When the predetermined information is input from the input unit, the control unit determines that the own device has been moved to the position of the passenger.

Therefore, it is possible to guide the passenger to the evacuation site after confirming the passenger to be evacuated.

(3) According to a third aspect, in the evacuation guidance system (40, 100) according to (1) or (2), the mobile body (20) includes an input unit (the camera 22, the microphone 23, and the thermo sensor 24) configured to receive input of information in a non-contact manner. When information is input from the input unit in the non-contact manner, the control unit determines that the own device has been moved to the position of the passenger.

Therefore, it is possible to guide the passenger to the evacuation site after confirming the passenger to be evacuated. Since the passenger can be confirmed by the non-contact input, it is possible to confirm the passenger without imposing a burden on the passenger who was late to escape.

(4) According to a fourth aspect, in the evacuation guidance system 100 according to (3), the non-contact input is an input of voice information uttered by the passenger or an input by a gesture of the passenger.

Since the passenger is confirmed by the input of the voice information, it is possible to confirm the passenger even in a situation in which it is not possible to come into contact with the mobile body. Since the passenger is confirmed by the input of the gesture, it is possible to confirm the passenger even in a situation in which it is not possible to make a sound.

(5) According to a fifth aspect, in the evacuation guidance system 100 according to any one of (1) to (4), the control unit (26) moves while monitoring a positional relationship between the passenger and the own device and adjusts a movement speed such that the position of the passenger is maintained within a predetermined range from the own device.

Therefore, it is possible to guide the passenger to be subjected to the evacuation guidance to the evacuation site without losing sight of the passenger.

(6) According to a sixth aspect, in the evacuation guidance system 100 according to any one of (1) to (5), the control unit (26) moves while monitoring a positional relationship between the passenger and the own device and issues an alarm when the position of the passenger deviates from a predetermined range.

When the passenger moves away during guidance, an alarm is issued to the passenger or the ground monitoring station. Therefore, it is possible to prevent losing sight of the passenger.

(7) According to a seventh aspect, in the evacuation guidance system 100 according to (5) or (6), when the position of the passenger deviates from the range, the control unit (26) moves in a reverse direction on the evacuation route to search for the passenger, on the basis of the position information of the passenger.

Therefore, even when sight of the passenger is lost during the evacuation guidance, it is possible to search for the passenger again and to resume the evacuation guidance.

(8) According to an eighth aspect, the evacuation guidance system 100 according to any one of (1) to (7) further includes a mobile terminal (30) configured to be possessed by the passenger and to measure position information of the mobile terminal. The control unit (26) moves the own device to the position of the passenger by moving the own device on the basis of position information of the mobile body (20) and the position information of the mobile terminal possessed by the specified passenger such that the position information of the mobile body approaches the position information of the mobile terminal.

Therefore, it is possible to pick up the passenger to be subjected to the evacuation guidance according to the latest actual position of the passenger (for example, even when the passenger to be subjected to the evacuation guidance moves).

(9) According to a ninth aspect, the evacuation guidance system 100 according to any one of (1) to (8) further includes a monitoring terminal (ground monitoring system 50) configured to be provided on land. The management system (10) is provided in the marine vessel, and the monitoring terminal instructs information of a movement route of the mobile body to the management system. The management system acquires the information of the movement route. The control unit (26) moves the own device on the basis of the information of the movement route acquired by the management system.

Therefore, the operation of the mobile body can be controlled by the monitoring terminal provided on the land.

(10) According to a tenth aspect, there is provided an evacuation guidance method executed by an evacuation guidance system that performs evacuation guidance for passengers using a mobile body. The evacuation guidance method includes: a step of acquiring information of a disaster which has occurred in a marine vessel; a step of acquiring position information of the passengers in the marine vessel on the basis of information of a sensor which detects a person; a step of formulating an evacuation route on the basis of passage passability information which is set from the position information of the passengers and the information of the disaster; a step of specifying the passenger to be subjected to the evacuation guidance and a position of the passenger from the position information of the passengers and the information of the disaster; a step of moving the mobile body to the position of the specified passenger on the basis of the specified passenger and the position of the specified passenger; and a step of, when an own device is moved to the position of the specified passenger, moving the mobile body along the evacuation route to guide the passenger.

20

INDUSTRIAL APPLICABILITY

According to the evacuation guidance system and the evacuation guidance method, it is possible to reduce the number of crew members required for evacuation guidance.

REFERENCE SIGNS LIST

10: Management system
11: Personnel distribution information acquisition unit
12: Route calculation unit
13: Evacuation information management unit
14: Evacuation guidance unit
15: Gathering place management unit
16: Safety management unit
17: Central safety control unit
18: Disaster information input unit
100: Evacuation guidance system
101: Camera
102: RFID reader
103: Fire alarm
104: Alarm
105: Speaker
106: Digital signage
107: Display lamp
108: Terminal
20: Guidance robot
21: Positioning sensor
22: Camera
23: Microphone
24: Thermo sensor
25: Input receiving unit
26: Control unit
27: Driving unit
28: Storage unit
29: Display unit
291: Voice output unit
292: Communication unit
30: Mobile terminal
31: Positioning sensor
32: Control unit
33: Communication unit
40: Onboard system
50: Ground monitoring system
51: Input unit
52: Control unit
53: Communication unit
54: Display unit
900: Computer
901: CPU
902: Main storage device
903: Auxiliary storage device
904: Input/output interface
905: Communication interface

What is claimed is:

1. An evacuation guidance system comprising:
a management system including
a disaster information acquisition unit configured to acquire information of a disaster which has occurred in a marine vessel,
a personnel distribution information acquisition unit configured to acquire position information of passengers in the marine vessel on the basis of information of a sensor which detects a person,
a route calculation unit configured to formulate an evacuation route on the basis of passage passability information which is set from the position information of the passengers from the personnel distribution information acquisition unit and the information of the disaster, and a guidance target passenger specification unit configured to specify a passenger to be subjected to evacuation guidance and a position of the passenger from the position information of the passengers acquired by the personnel distribution information acquisition unit and the information of the disaster; and a mobile body including:

a control unit configured to move an own device to the position of the passenger specified by the guidance target passenger specification unit on the basis of the specified passenger and the position of the specified passenger and to move the own device along the evacuation route calculated by the route calculation unit to guide the passenger when the own device is moved to the position of the passenger, and an input unit configured to receive input of information in a contact manner and an output unit, wherein the output unit outputs information requesting input of predetermined information in the contact manner through the input unit when a position of the own device is within a predetermined range from the position of the passenger, and when the predetermined information is input from the input unit, the control unit determines that the own device has been moved to the position of the passenger.

2. The evacuation guidance system according to claim 1, wherein the mobile body includes an input unit configured to receive input of information in a non-contact manner, and when predetermined information is input from the input unit in the non-contact manner, the control unit determines that the own device has been moved to the position of the passenger.

3. The evacuation guidance system according to claim 2, wherein the non-contact input is an input of voice information uttered by the passenger or an input by a gesture of the passenger.

4. The evacuation guidance system according to claim 1, wherein the control unit moves while monitoring a positional relationship between the passenger and the own device and adjusts a movement speed such that the position of the passenger is maintained within a predetermined range from the own device.

5. The evacuation guidance system according to claim 4, wherein, when the position of the passenger deviates from the range, the control unit moves in a reverse direction on the evacuation route to search for the passenger, on the basis of the position information of the passenger.

6. The evacuation guidance system according to claim 1, wherein the control unit moves while monitoring a positional relationship between the passenger and the own device and issues an alarm when the position of the passenger deviates from a predetermined range.

7. The evacuation guidance system according to claim 1, further comprising:

a mobile terminal configured to be possessed by the passenger and to measure position information of the mobile terminal, wherein the control unit moves the own device to the position of the passenger by moving the own device on the basis of position information of the mobile body and the position information of the mobile terminal possessed by the specified passenger such that the position information of the mobile body approaches the position information of the mobile terminal.

8. The evacuation guidance system according to claim 1, further comprising:

a monitoring terminal configured to be provided on land, wherein the management system is provided in the marine vessel, the monitoring terminal transmits information of a movement route of the mobile body to the management system, the management system acquires the information of the movement route, and the control unit moves the own device on the basis of the information of the movement route acquired by the management system.

9. An evacuation guidance method executed by an evacuation guidance system that performs evacuation guidance for passengers using a mobile body, the evacuation guidance method comprising:

a step of acquiring information of a disaster which has occurred in a marine vessel;

a step of acquiring position information of the passengers in the marine vessel on the basis of information of a sensor which detects a person;

a step of formulating an evacuation route on the basis of passage passability information which is set from the position information of the passengers and the information of the disaster;

a step of specifying the passenger to be subjected to the evacuation guidance and a position of the passenger from the position information of the passengers and the information of the disaster;

a step of moving the mobile body to the position of the specified passenger on the basis of the specified passenger and the position of the specified passenger; and a step of, when an own device is moved to the position of the specified passenger, moving the mobile body along the evacuation route to guide the passenger, wherein, in the step of moving the mobile body and guiding the passenger, outputting through an output unit of the own device information requesting input of predetermined information in the contact manner through an input unit of the own device when a position of the own device is within a predetermined range from the position of the passenger, and determining that the own device has been moved to the position of the passenger when the predetermined information is input from the input unit.

* * * * *